(12) United States Patent
Song et al.

(10) Patent No.: US 6,761,574 B1
(45) Date of Patent: Jul. 13, 2004

(54) COILED TUBING CONNECTOR

(75) Inventors: Haoshi Song, Sugar Land, TX (US); James W. Estep, Houston, TX (US); James B. Terry, Houston, TX (US); Thomas Platt Wilson, Lafayette, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/534,685

(22) Filed: Mar. 24, 2000

Related U.S. Application Data

(63) Continuation-in-part of application No. 09/081,961, filed on May 20, 1998, now Pat. No. 6,296,066.
(60) Provisional application No. 60/063,326, filed on Oct. 27, 1997.

(51) Int. Cl.[7] .............................................. H01R 13/62
(52) U.S. Cl. ........................................ 439/320; 285/39
(58) Field of Search ................................ 439/190–205, 439/319–322; 175/92; 285/39

(56) References Cited

U.S. PATENT DOCUMENTS

| | | | | |
|---|---|---|---|---|
| 3,753,206 A | * | 8/1973 | Busuttil ........................ 339/16 |
| 3,879,097 A | * | 4/1975 | Oertle .......................... 339/16 |
| 4,012,092 A | * | 3/1977 | Godbey ........................ 339/16 |
| 4,039,237 A | * | 8/1977 | Cullen ....................... 339/91 R |
| 4,220,381 A | * | 9/1980 | Graaf ....................... 339/16 C |
| 4,496,203 A | * | 1/1985 | Meadows ................. 339/16 C |
| 4,530,379 A | | 7/1985 | Policelli ..................... 138/109 |
| 4,557,538 A | * | 12/1985 | Chevalier .................... 339/16 |
| 4,568,145 A | | 2/1986 | Colin et al. |
| 4,690,212 A | * | 9/1987 | Termohlen ................. 166/65.1 |
| 4,698,028 A | | 10/1987 | Caro et al. .................. 439/271 |
| 4,699,454 A | | 10/1987 | Brubaker ................... 350/96.2 |
| 4,844,516 A | | 7/1989 | Baker ......................... 285/351 |
| 4,913,657 A | * | 4/1990 | Naito .......................... 439/192 |
| 4,936,618 A | | 6/1990 | Sampa et al. ............. 294/86.31 |
| 5,064,268 A | | 11/1991 | Morency et al. .............. 385/87 |
| 5,146,982 A | | 9/1992 | Dinkins ..................... 166/65.1 |
| 5,156,206 A | | 10/1992 | Cox ............................ 166/242 |
| 5,332,049 A | | 7/1994 | Tew ............................ 175/320 |
| 5,351,752 A | | 10/1994 | Wood et al. .................. 166/68 |
| 5,443,099 A | | 8/1995 | Chaussepied et al. ........ 138/109 |
| 5,452,923 A | | 9/1995 | Smith ......................... 285/145 |
| 5,828,003 A | | 10/1998 | Thomeer et al. .............. 174/69 |
| 5,933,945 A | | 8/1999 | Thomeer et al. .............. 29/825 |
| 5,988,702 A | | 11/1999 | Sas-Jaworsky ............. 285/249 |
| 6,065,540 A | | 5/2000 | Thomeer et al. ............ 166/297 |
| 6,296,066 B1 | * | 10/2001 | Terry ............................ 175/92 |

FOREIGN PATENT DOCUMENTS

WO         9712115         3/1997

OTHER PUBLICATIONS

PCT International Search Report for Appln. No. PCT/US01/08172 dated Jul. 10, 2002; (6 p.).

* cited by examiner

Primary Examiner—Gary Estremsky
(74) Attorney, Agent, or Firm—Conley Rose, P.C.

(57) ABSTRACT

A coiled tubing connector includes a male and female housing. A rotating ring having threads is disposed on the male housing. When the male housing is joined to the female housing, the threads of the rotating ring threadingly engage threads disposed on the internal circumference of the female housing. The male housing also includes splines which align with grooves on the female housing. Situated on both the male and female housing are electrical contacts which themselves engage when the housings are joined. The electrical contacts are connected to wires embedded in the composite tubing so that electrical power or data signals from one length of composite tubing can pass through the connector to another length of coiled tubing. The ends of the composite tubing are affixed to both the male and female housings through a compression fitting.

26 Claims, 9 Drawing Sheets

COILED TUBING CONNECTOR

CROSS-REFERENCE TO RELATED APPLICATIONS

The present application claims the benefit under 35 U.S.C. 119(e) of U.S. provisional application Serial No. 60/063,326, filed Oct. 27, 1997 and entitled Drilling System and is a divisional and continuation-in-part of U.S. patent application Ser. No. 09/081,961 filed May 20, 1998 now U.S. Pat. No. 6,296,066 and entitled Drilling System, both hereby incorporated herein by reference.

STATEMENT REGARDING FEDERALLY SPONSORED RESEARCH OR DEVELOPMENT

Not Applicable.

FIELD OF THE INVENTION

The present invention relates generally to devices used to connect lengths of coiled tubing and more particularly to devices used to connect lengths of composite coiled tubing. Another feature of the present invention relates to providing a mechanical connection of sufficient strength so that forces of tension, compression, and torque can be transferred from one length of tubing to the other through the connector. Further the connection between lengths of tubing is hydraulically sealed so as to separate fluids conducted inside the tubing and the connector from any fluids on the outside of the tubing and connector. The connector also permits the fluids inside a length of tubing to flow through the connector on to the sequential length of tubing. The connector of the present invention also provides a mechanism that permits the lengths of tubing to be connected without imparting any rotation on either length of tubing. Additionally, the invention relates to connectors that will also allow an electrical connection from the joining of electrical wires, or other types of signaling cables, embedded within each multi-conductor pair of tubing to be joined. The electrical connection provides seals and insulation that insulates both wire-to-wire and wire-to-fluid.

BACKGROUND OF THE INVENTION

Many existing wells include hydrocarbon pay zones which were bypassed during drilling and completion because such bypassed zones were not economical to complete and produce. Offshore drilling rigs cost approximately $40 million to build and may cost as much as $250,000 a day to lease. Such costs preclude the use of such expensive rigs to drill and complete these bypassed hydrocarbon pay zones. Presently, there is no cost effective methods of producing many bypassed zones. Thus, often only the larger oil and gas producing zones are completed and produced because those wells are sufficiently productive to justify the cost of drilling and completion using offshore rigs.

Many major oil and gas fields are now paying out and there is a need for a cost effective method of producing these previously bypassed hydrocarbon pay zones. The locations and size of these bypassed hydrocarbon zones are generally known, particularly in the more mature producing fields.

To economically drill and complete the bypassed pay zones in existing wells, it is necessary to eliminate the use of conventional rigs and conventional drilling equipment. One method of producing wells without rigs is the use of metal coiled tubing with a bottom hole assembly. See for example U.S. Pat. Nos. 5,115,151; 5,394,951 and 5,713,422, all incorporated herein by reference. The bottom hole assembly typically includes a downhole motor providing the power to rotate a bit for drilling the borehole. The bottom hole assembly operates only in the sliding mode since the metal coiled tubing is not rotated at the surface like that of steel drill pipe which is rotated by a rotary table on the rig. The bottom hole assembly may include a tractor which propels the bottom hole assembly down the borehole. One such tractor is a thruster that pushes off the lower terminal end of the coiled tubing and does not rely upon contacting or gripping the inside wall of the borehole. The depth that can be drilled by such a bottom hole assembly is limited.

Coiled tubing, as currently deployed in the oilfield industry, generally includes small diameter cylindrical tubing having a relatively thin wall made of metal or composite material. Coiled tubing is typically much more flexible and of lighter weight than conventional drill pipe. These characteristics of coiled tubing have led to its use in various well operations. For example, coiled tubing is routinely utilized to inject gas or other fluids into the well bore, inflate or activate bridges and packers, transport well logging tools downhole, perform remedial cementing and clean-out operations in the well bore, and to deliver or retrieve drilling tools downhole. The flexible, lightweight nature of coiled tubing makes it particularly useful in deviated well bores.

Typically, coiled tubing is introduced into the oil or gas well bore through wellhead control equipment. A conventional handling system for coiled tubing can include a reel assembly, a gooseneck, and a tubing injector head. The reel assembly includes a rotating reel for storing coiled tubing, a cradle for supporting the reel, a drive motor, and a rotary coupling. During operation, the tubing injector head draws coiled tubing stored on the reel and injects the coiled tubing into a wellhead. The drive motor rotates the reel to pay out the coiled tubing and the gooseneck directs the coil tubing into the injector head. A rotary coupling provides an interface between the reel assembly and a fluid line from a pump. Fluids are often pumped through the coiled tubing during operations. Such arrangements and equipment for coiled tubing are well known in the art.

The use of metal coiled tubing has various deficiencies. Metal coiled tubing tends to buckle the deeper the bottom hole assembly penetrates the borehole. Buckling is particularly acute in deviated wells where gravity does not assist in pulling the tubing downhole. As the tubing buckles, the torque and drag created by the contact with the borehole becomes more difficult to overcome and often makes it impractical or impossible to use coiled tubing to reach distant bypassed hydrocarbon zones. Further, steel coiled tubing often fatigues from cyclic bending early in the drilling process and must be replaced. It has also been found that coiled tubing may be as expensive to use as a conventional drilling system using jointed steel pipe and a rig.

While prior art coiled tubing handling systems are satisfactory for coiled tubing made of metal such as steel, these systems do not accommodate the relatively long spans or drill string lengths achievable with coiled tubing made of composites. Such extended spans of composite coiled tubing strings are possible because composite coiled tubing is significantly lighter than steel coiled tubing. In fact, composite coiled tubing can be manufactured to have neutral buoyancy in drilling mud. With composite coiled tubing effectively floating in the drilling mud, downhole tools, such as tractors, need only overcome frictional forces in order to tow the composite coiled tubing through a well bore. This characteristic of composites markedly increases the operational reach of composite coiled tubing. Thus, composite coiled tubing may well allow well completions to depths of 20,000 feet or more, depths previously not easily achieved by other methods.

Moreover, composite coiled tubing is highly resistant to fatigue failure caused by "bending events," a mode of failure that is often a concern with steel coiled tubing. At least three bending events may occur before newly manufactured coiled tubing enters a well bore: unbending when the coiled tubing is first unspooled from the reel, bending when travelling over a gooseneck, and unbending upon entry into an injector. Such accumulation of bending events can seriously undermine the integrity of steel coiled tubing and pose a threat to personnel and rig operations. Accordingly, steel coiled tubing is usually retired from service after only a few trips into a well bore. However, composite coiled tubing is largely unaffected by such bending events and can remain in service for a much longer period of time.

Hence, systems utilizing composite coiled tubing can be safely and cost-effectively used to drill and explore deeper and longer wells than previously possible with conventional drilling systems. Moreover, completed but unproductive wells may be reworked to improve hydrocarbon recovery. Thus, composite coiled tubing systems can allow drilling operations into formations that have been inaccessible in the past and thereby further maximize recovery of fossil fuels.

However, these dramatic improvements in drilling operations cannot be realized without handling systems that can efficiently and cost-effectively deploy extended lengths of composite coiled tubing. Prior art coiled tubing handling systems do not readily accommodate the reel change-outs needed when injecting thousands of feet of coiled tubing downhole. Prior art coiled tubing handling systems require a work stoppage to change out an empty reel for a full reel. Because such a procedure is inefficient, there is a need for a coiled tubing handling system that more efficiently changes out successive reels of coiled tubing.

Composite coiled tubing offers the potential to exceed the performance limitations of isotropic metals, thereby increasing the service life of the pipe and extending operational parameters. Composite coiled tubing is constructed as a continuous tube fabricated generally from non-metallic materials to provide high body strength and wear resistance. This tubing can be tailored to exhibit unique characteristics which optimally address burst and collapse pressures, pull and compression loads, as well as high strains imposed by bending. This enabling capability expands the performance parameters beyond the physical limitations of steel or alternative isotropic material tubulars. In addition, the fibers and resins used in composite coiled tubing construction make the tube impervious to corrosion and resistant to chemicals used in treatment of oil and gas wells.

High performance composite structures are generally constructed as a buildup of laminant layers with the fibers in each layer oriented in a particular direction or directions. These fibers are normally locked into a preferred orientation by a surrounding matrix material. The matrix material, normally much weaker than the fibers, serves the role of transferring load into the fibers. Fibers having a high potential for application in constructing composite pipe include glass, carbon, and aramid. Epoxy or thermoplastic resins are good candidates for the matrix material.

A composite umbilical or coiled tubing, as shown in FIG. 9, typically has an impermeable fluid liner 232, a plurality of load carrying layers 234, and a wear layer 236. A plurality of conductors 240, 242 may be embedded in the load carrying layers 234. These conductors may be metallic or fiber optic conductors such as electrical conductors 240 and data transmission conductors 242. One or more of the data transmission conductors 242 may include a plurality of sensors 244. It should be appreciated that the conductors may be passages extending the length of an umbilical for the transmission of pressure fluids.

Types of composite tubing are shown and described in U.S. Pat. Nos. 5,018,583; 5,097,870; 5,176,180; 5,285,008; 5,285,204; 5,330,807; 5,348,096; and 5,469,916, each of these patents is incorporated herein by reference. See also "Development of Composite Coiled Tubing for Oilfield Services," by A. Sas-Jaworsky and J. G. Williams, SPE Paper 26536, 1993, incorporated herein by reference. U.S. Pat. Nos. 5,080,175; 5,172,765; 5,234,058; 5,437,899; and 5,540,870, each of these patents being incorporated herein by reference, disclose composite rods, electrical or optical conductors housed in a composite cable.

The impermeable fluid liner 232 is often an inner tube preferably made of a polymer, such as polyvinyl chloride or polyethylene. The liner 232 can also be made of a nylon, other special polymer, or elastomer. In selecting an appropriate material for a fluid liner 232, consideration is given to the chemicals in the drilling fluids to be used in drilling the sidetracked well and the temperatures to be encountered downhole. The primary purpose for an inner liner 232 is as an impermeable fluid barrier since carbon fibers are not impervious to fluid migration particularly after they have been bent. The inner liner 232 is impermeable to fluids and thereby isolates the load carrying layers 234 from the drilling fluids passing through the flow bore of the liner. An inner liner 232 also serves as a mandrel for the application of the load carrying layers 234 during the manufacturing process for the composite umbilical.

The load carrying layers are preferably a resin fiber having a sufficient number of layers to sustain the required load of the work string suspended in fluid, including the weight of the composite umbilical and bottom hole assembly.

The fibers of load carrying layers are preferably wound into a thermal setting or curable resin. Carbon fibers are preferred because of their strength, and although glass fibers are not as strong, glass fibers are much less expensive than carbon fibers. Also, a hybrid of carbon and glass fibers may be used. Thus, the particular fibers for the load carrying layers will depend upon the well, particularly the depth of the well, such that an appropriate compromise of strength and cost may be achieved in the fiber selected. Typically an all carbon fiber is preferred because of its strength and its ability to withstand pressure.

Load carrying fibers provide the mechanical properties of the composite umbilical. The load carrying layers are wrapped and braided so as to provide the composite umbilical with various mechanical properties including tensile and compressive strength, burst strength, flexibility, resistance to caustic fluids, gas invasion, external hydrostatic pressure, internal fluid pressure, ability to be stripped into the borehole, density, i.e. flotation, fatigue resistance and other mechanical properties. Fibers are uniquely wrapped and braided to maximize the mechanical properties of composite umbilical including adding substantially to its strength.

The wear layer 236 is preferably braided around the outermost load carrying layer 234. The wear layer 236 may also be a sacrificial layer since it will engage the inner wall of the borehole and will wear as the composite umbilical is tripped into the well. A wear layer 236 protects the underlying load carrying layers 234. One preferred wear layer is that of Kevlar™, which is a very strong material that is resistant to abrasion. There may be additional wear layers as required. One advantage of a distinct wear layer is that it can be of a different fiber and color, making it easy to determine the wear locations on a composite umbilical. An inner liner and wear layer are not critical to the use of a composite umbilical and may not be required in certain applications. A pressure layer 238 may also be applied although not required.

During the braiding process, electrical conductors 240, data transmission conductors 242, sensors 244 and other data links may be embedded between the load carrying layers 234 in the wall of a composite umbilical. These are wound into the wall of the composite umbilical with the carbon, hybrid, or glass fibers of load carrying layers 234. It should be appreciated that any number of electrical conductors 240, data transmission conduits 242, and sensors 238 may be embedded as desired in the wall of a composite umbilical.

The electrical conductors 240 may include one or more copper wires such as wire 241, multi-conductor copper wires, braided wires 243, or coaxial woven conductors 245. These are connected to a power supply at the surface. A braided copper wire or coaxial cable is wound with the fibers integral to the load carrying layers 234. Although individual copper wires may be used, a braided copper wire provides a greater transmission capacity with reduced resistance along a composite umbilical. Electrical conductors allow the transmission of a large amount of electrical power from the surface to the bottom hole assembly through essentially a single conductor. With multiplexing, there may be two-way communication through a single conductor between the surface and bottom hole assembly. This single conductor may provide data transmission to the surface.

During the braiding process, electrical conductors, data transmission conductors, sensors and other data links may be embedded between the load carrying layers in the wall of a composite umbilical. These are wound into the wall of the composite umbilical with the carbon, hybrid, or glass fibers of load carrying layers. It should be appreciated that any number of electrical conductors, data transmission conduits, and sensors may be embedded as desired in the wall of a composite umbilical.

The electrical conductors may include one or more copper wires such as wire, multi-conductor copper wires, braided wires, or coaxial woven conductors. These are connected to a power supply at the surface. A braided copper wire or coaxial cable is wound with the fibers integral to the load carrying layers. Although individual copper wires may be used, a braided copper wire provides a greater transmission capacity with reduced resistance along a composite umbilical. Electrical conductors allow the transmission of a large amount of electrical power from the surface to the bottom hole assembly through essentially a single conductor. With multiplexing, there may be two-way communication through a single conductor between the surface and bottom hole assembly. This single conductor may provide data transmission to the surface.

The principal copper conductor used for power transmission from the power supply at the surface to the bottom hole assembly is preferably braided copper wire. The braided cooper wire may be used to provide the power for a power section which rotates the bit. Braided copper wire may conduct a large voltage, such as 400 volts of electricity, from the surface, which will generate heat that must be dissipated. Braided copper wire is preferably disposed between the two outermost load carrying layers. By locating braided copper wire adjacent the outer diameter of a composite umbilical, the braided copper wire is disposed over a greater surface area of layers to maximize the dissipation of heat.

The data transmission conduit may be a plurality of fiber optic data strands or cables providing communication to the controls at the surface such that all data is transmitted in either direction fiber optically, Fiber optic cables provide a broad band width transmission and permit two-way communication between bottom hole assembly and the surface. As previously described, the fiber optic cable may be linear or spirally wound in the carbon, hybrid or glass fibers of load carrying layers.

A composite umbilical is coilable so that it may be spooled onto a drum. In the manufacturing of composite umbilical, the inner liner is spooled off a drum and passed linearly through a braiding machine. The carbon, hybrid, or glass fibers are then braided onto the inner liner as the liner passes through multiple braiding machines, each braiding a layer of fiber onto the inner liner. The finished composite umbilical is then spooled onto a drum.

During the braiding process, the electrical conductors, data transmission conductors, and sensors are applied to the composite umbilical between the braiding of load carrying layers. Conductors may be laid linearly, wound spirally or braided around the umbilical during the manufacturing process while braiding the fibers. Further, conductors may be wound at a particular angle so as to compensate for the expansion of the inner liner upon pressurization of composite umbilical. A composite umbilical may be made of various diameters. The size of umbilical, of course, will be determined by the particular application and well for which it is to be used.

Although it is possible that the composite umbilical may have any continuous length, such as up to 25,000 feet, it is preferred that the composite umbilical be manufactured in shorter lengths as, for example, in 1,000, 5,000, and 10,000 foot lengths. A typical drum will hold approximately 12,000 feet of composite umbilical. However, it is typical to have additional back up drums available with additional composite umbilical. These drums, of course, may be used to add or shorten the length of the composite umbilical. With respect to the diameters and weight of the composite umbilical, there is no practical limitation as to its length.

The composite umbilical has all of the properties requisite to enable the drilling and completion of extended reach wells. In particular, the composite umbilical has great strength for its weight when suspended in fluid as compared to ferrous materials and has good longevity. Composite umbilical also is compatible with the drilling fluids used to drill the borehole and approaches buoyancy (dependent upon mud weight and density) upon passing drilling fluids down its flowbore and back up the annulus formed by the borehole. This reduces to acceptable limits drag and other friction factors previously encountered by metal pipe. Composite umbilical may be used in elevated temperatures particularly when a heat exchanger is placed on drilling platform to cool the drilling fluids circulating through the borehole. Since the composite umbilical is not rotated to rotate a bit, no torque is placed on composite umbilical.

In current practice coiled tubing is often used in conjunction with a bottom hole assembly connected to the end of the tubing string. The bottom hole assembly may include a variety of downhole tools and devices including sensors, orientation devices, motors, hydraulic rams, and steering tools. If the tubing is supporting a bottom hole assembly for drilling, the bottom hole assembly will include a drill bit and other drilling equipment. Sensors and monitoring equipment of other kinds may be located upstream of the drill bit. One consequence of the variety of equipment used in conjunction with coiled tubing string is the need for some means to conduct electrical power and signals from one end of the string to the other. In this way power and signals from the control/operating point on the surface can be sent to the bottom hole assembly at the opposite end of the string, and likewise signals from the bottom hole assembly can be transmitted to the surface. Thus composite coiled tubing may be manufactured with conductors embedded in the wall of the tubing itself. The conductors may be electrical wires, optical transmitting cables, or other forms of cabling that permit the transmission of energy or data. Electrical conductors within the coiled tubing can be connected to the bottom hole assembly at one end of the string; and at the opposite end of the string, the conductors can be connected to meters, gauges, control equipment, computers, and the like.

The transmission of signals through composite coiled tubing does present one problem, however. When two or more lengths of tubing must be joined to provide the required overall length for the particular well operation, a connector must be provided to pass the energy or data between adjoining lengths of coiled tubing. Such a connection must first provide a robust electrical contact between the two lengths of wire to be joined so that an uninterrupted signal may pass even in the presence of the shaking and jarring that occur during a well operation. In addition the connection must provide insulation. The connected conductors must not only be insulated from the fluids and other matter in the surrounding well environment but in addition the connected conductors must be properly insulated from the other conductors within the composite tubing. Materials that are present in the well environment can be highly corrosive and destructive of electrical conductors. A common shortcoming of the existing methods for connecting composite coiled tubing is that they do not adequately meet the need for a robust and well insulated electrical connection of the electrical conductors in the joined sets of tubing.

Notwithstanding the foregoing described prior art, there remains a need for a coiled tubing connector that combines the features of a strong mechanical connection, sealing the fluids within the coiled tubing from the outside environment, and providing a robust electrical connection. These and other features and advantages are found in the present invention.

SUMMARY OF THE INVENTION

The present invention overcomes the aforementioned deficiencies of the prior art by providing a connector that comprises female and male housings which join together to create the coiled tubing connection. A rotating ring on the male housing includes threads that engage corresponding threads on the female housing. Spindles on the male housing also align with corresponding flutes on the female housing. The female and male housings each attach to end portions of coiled tubing through a clamp or threaded connection.

The present invention preferably includes lengths of a composite umbilical having an inner fluid impermeable liner, multiple load carrying layers, and an outer wear layer. The load carrying layers are preferably resin fibers braided around the inner liner. Multiple electrical conductors and data transmission conductors are embedded in the load carrying layers for carrying electric current and transmitting data between the bottom hole assembly and the surface. Also, a plurality of sensors may be mounted on one or more of the data transmission conduits along the length of the composite umbilical.

A first advantage of the connector of the present invention is that it provides a robust connection to join successive lengths of composite coiled tubing. In this way forces of compression, tension and torque can be passed along the length of composite drill string.

Another advantage of the connector of the present invention is that it provides a hydraulic seal to separate the fluids passing through the interior of the coiled tubing from fluids and materials passing externally of the coiled tubing. The connector also allows fluids to pass uninterrupted from one length of tubing to the succeeding length of tubing.

Composite tubing may not hold a perfectly round cross-section. The fact that composite tubing is flexible allows it to bend to an out-of-round cross-section. The connector of the present invention assures that the coiled tubing will be strongly bound and sealed to the connector in spite of the tubing's tendency to be out-of-round. The connector achieves this advantage by providing hydraulic seals.

A further advantage of the present invention is that the connector may be assembled without imparting rotational forces on either length of coiled tubing.

A further advantage of the present invention is that it provides for a strong, well protected contact between matched pairs of electrical conductors in adjoining lengths of composite tubing. This contact is achieved through matching sets of ring contacts. The ring contact attached to the male end has a spring back located underneath the mating surface of the ring contact. Thus when the male contact ring engages the female contact ring, the spring back firmly engages the contacts.

Another advantage of the electrical contact achieved through the present connector is the insulation it provides from the surrounding well environment as well as between the neighboring electrical signals from adjacent conductors.

Another advantage of the connector is that many of the parts in the sub-assembly of the connector are the same for both the male and female pieces of the connector. Thus, there is no need for additional designs, drawings, or inventory. The same part may be used for construction of either the male or female housing Thus, the present invention comprises a combination of features and advantages that enable it to overcome various problems of prior art coiled tubing connectors. The various characteristics described above, as well as other features, objects, and advantages, will be readily apparent to those skilled in the art upon reading the following detailed description of the preferred embodiments of the invention, and by referring to the accompanying drawings.

BRIEF DESCRIPTION OF THE DRAWINGS

For a detailed description of a preferred embodiment of the present invention, reference will now be made to the accompanying drawings, which form a part of the specification, and wherein.

DESCRIPTION OF THE PREFERRED EMBODIMENTS

Figure 1:
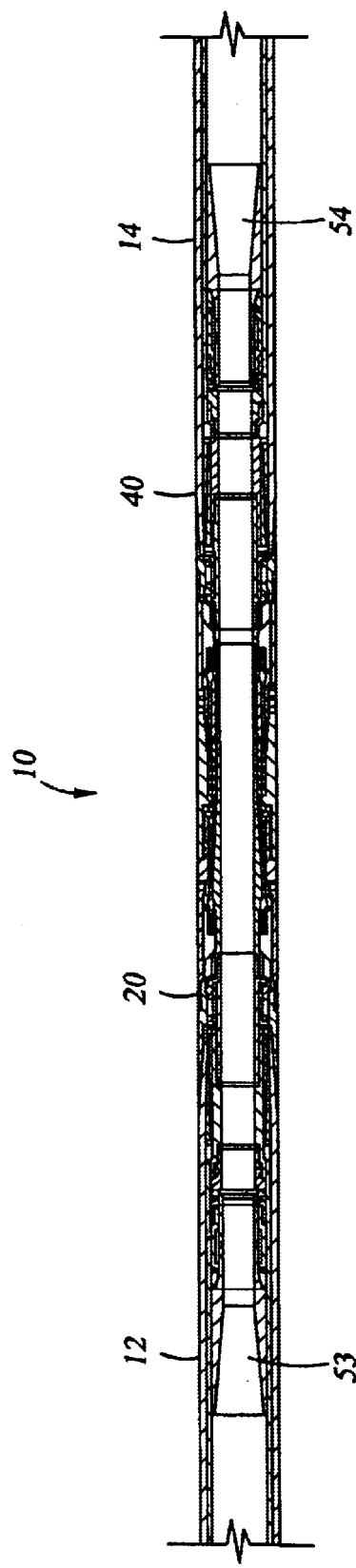
FIG. 1 is a cross-sectional view of a connector connecting two lengths of composite tubing.

The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

The coiled tubing connector of the present invention includes a female and a male housing which join together to create the coiled tubing connection. A rotating ring on the male housing includes threads that engage corresponding threads on the female housing. Splines on the male housing also align with corresponding grooves on the female housing. The female and male housings each attach to end portions of coiled tubing through a clamp connection. Passageways or conduits within the female and male housings also allow electrical conductors embedded within each piece of coiled tubing to pass to ring contacts. Ring contacts on both the female and male housings also align when the housings are connected so as to allow electrical energy or signals to pass from one length of coiled tubing to the next.

Referring initially to FIG. 1, there is shown one preferred embodiment of a connector 10 for connecting adjacent lengths 12, 14 of composite coiled tubing. The connector 10 comprises a male housing 20 and female housing 40.

A composite umbilical of adjacent lengths of composite tubing 12, 14 serves as the work string. The operative salient properties of the composite umbilical are a tube having an axial component of the modulus of elasticity with a Young's modulus in the range of 500,000 to 10,500,000 psi. The preferred range of Young's modulus is from 2,000,000 to 5,000,000 psi. The tube is non-isotropic and the modulus of elasticity is not the same in all axes nor is it linear. Embodiments of the pipe may be constructed of fibers such as nonmetallic fibers, metallic fibers, or a mixture of nonmetallic and metallic fibers. One embodiment includes a tube constructed from helically wound or braided fiber reinforced thermoplastic or fiber reinforced thermosetting polymer or epoxy. The fiber may be non-metallic or metallic or a mixture of metallic and non-metallic materials. The composite umbilical preferably is made of a material having a density with a specific gravity in the range of 0.99 grams per cubic centimeter to 2.9 grams per cubic centimeter.

Figure 2:
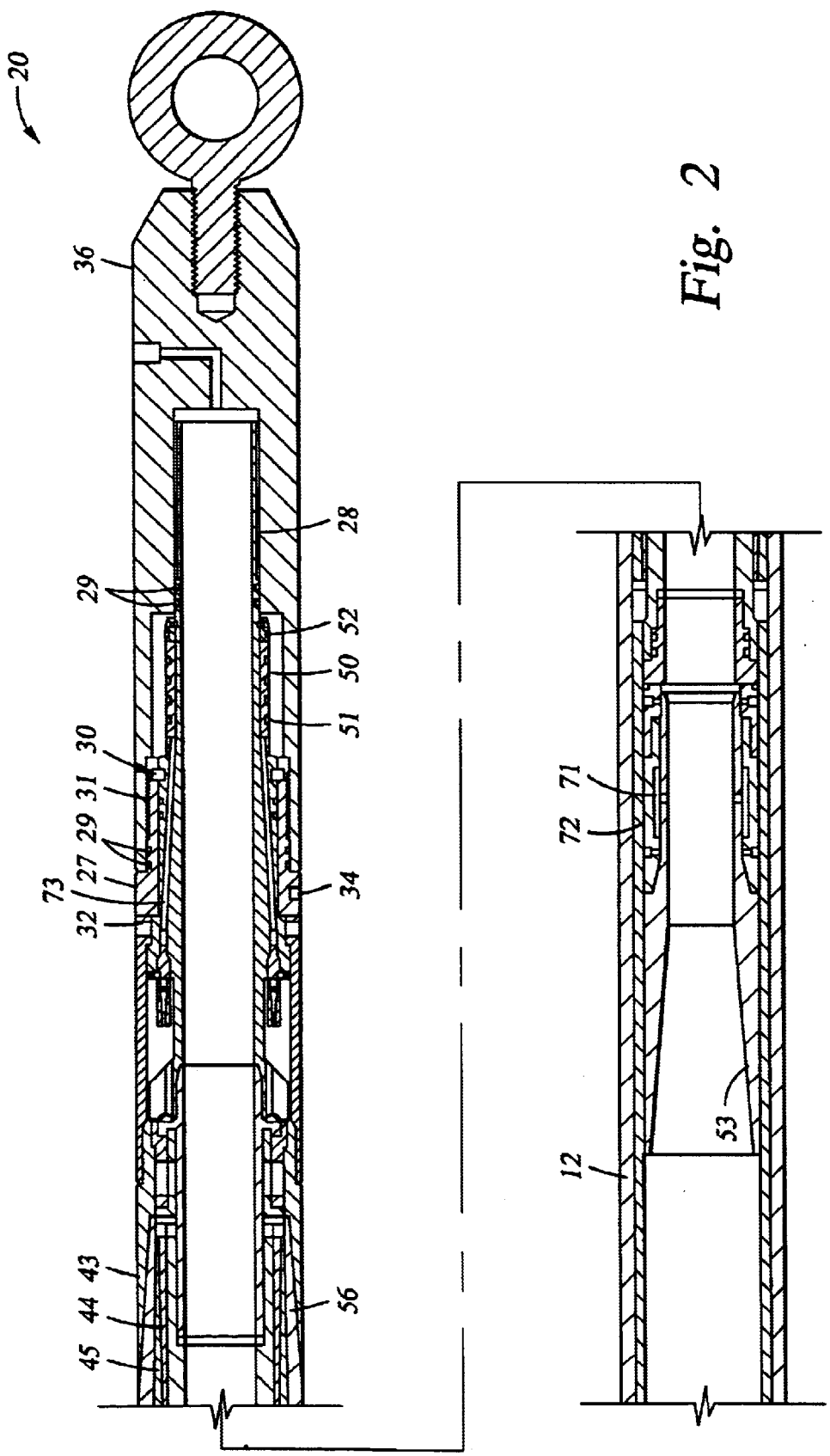
FIG. 2 is a cross sectional view of the male housing of the connector.

Referring now to FIG. 2, the male housing 20 is generally in the form of a hollow cylinder. Moving generally from right to left in FIG. 2, several features of the male housing are shown. Splines 28 are machined on or affixed onto an exterior edge of said male housing. An inner electrical contact 50 is also positioned on male housing 20. Inner electrical contact 50 is generally cylindrical in shape and includes both electrical contacts or rings 51 and wiper seals 52. Inner electrical contact 50 generally rests on the outer radius of male housing 20. Contact rings 51 are composed of any electrical conductor, and wiper seals 52 are composed of an electrical insulator.

Still referring to FIG. 2, rotating ring 27 is positioned on male housing 20. Rotating ring 27 rotates freely around the barrel of male housing 20; however rotating ring 27 does not slide axially along the length of male housing 20. Rotating ring 27 is prevented from sliding along the length of male housing 20 by a lock ring 30 and may be prevented by conventional mechanical devices such as splines or stops. Rotating ring 27 also includes threads 31 on its exterior surface.

Another feature of male housing 20 and rotating ring 27 is the presence of seals 29. In the preferred embodiment of this invention, seals 29, 37 are positioned on the surfaces of the male housing 20 and the rotating ring 27, respectively. However, the seals could also be positioned on female housing 40. The seals themselves ate composed of an elastomeric material that will allow a compression seal to form against the hydraulic pressures encountered in the well. As shown, seals 29, 37 may be positioned into grooves, recesses or rings positioned on the male housing 20 and rotating ring 27.

Figure 3:
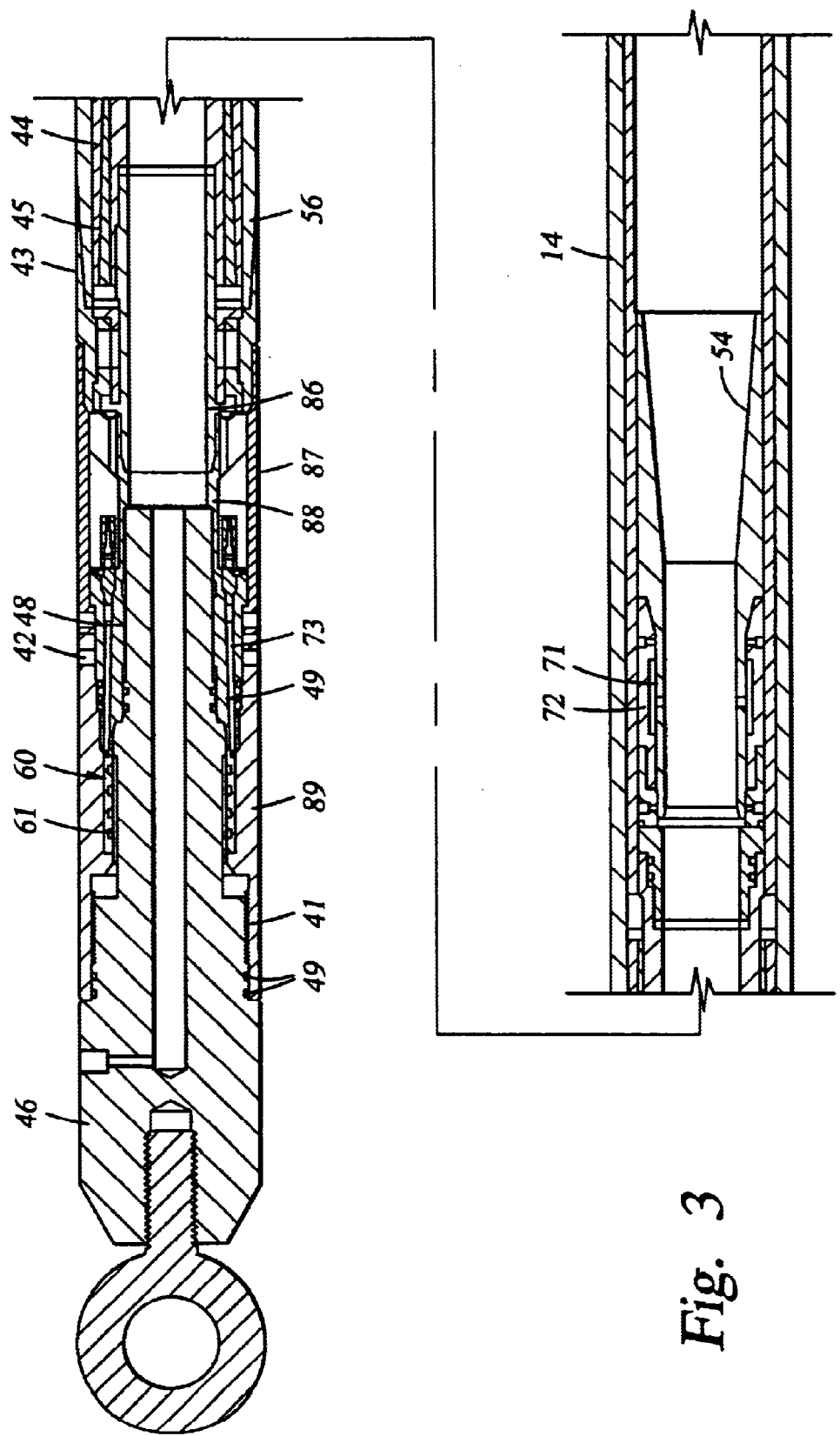
FIG. 3 is a cross-sectional view of the female housing of the connector.

Referring now to FIG. 3, female housing 40 is shown. Like male housing 20, the female housing 40 is also generally cylindrical in form. Female housing 40 includes slots or grooves 48 and receiving threads 41. Female housing 40 also has sealing surfaces 49 and outer electrical contact 60, both positioned on the internal diameter of female housing 40.

Outer electrical contact 60 is generally cylindrical in shape and includes outer electrical plates or rings 61. In a preferred embodiment, the outer electrical contact 60 contains an outer electrical ring 61 for each conductor on the inner electrical contact 50. Contact rings 61 may be composed of any conducting material. Outer electrical rings 61 are not separated by wiper seals but by a plastic insulator, not shown. Outer electrical contact 60 is positioned on the inner radius of female housing 40. Electrical rings 61 are connected to conductors embedded in composite tubing 14 that is joined to female housing 40.

Both male housing 20 and female housing 40 share many common features. For ease of discussion, these common features are identified below together.

Referring again to FIGS. 2 and 3 there is shown a passage 71 and conforming seal 72. The conforming seals 72 are composed of an elastomeric material that will allow a compression seal to form under hydraulic pressure.

Both male and female housings include axial passageways 73. These passageways are hollows or grooves, approximately of the diameter or clearance of an electrical wire. The passageways may take any of several shapes depending on the ultimate shape of the connector 10 and the chosen method of manufacture.

In a preferred embodiment, the male housing 20, female housing 40, and rotating ring 27 have a plurality of apertures 32, 34, and 42 drilled into each member.

Both male housing 20 and female housing 40 include an outer conical housing 43 and inner skirt 44. Encircling inner skirt 44 on both male and female housings is split ring wedge 45. In a preferred embodiment, the outer diameter of split ring wedge 45 is straight and the inner diameter is tapered. The conical housing 43 has a straight outer diameter and a tapered inner diameter. The inner skirt 44 has a straight inner diameter and a tapered outer diameter. The split ring wedge 45 itself is manufactured from a material that shows strength at high stress and yet is relatively flexible. Beryllium copper has been used as a suitable material. The other components of both the female and male housing 40, 20 are constructed of any high strength material, such as steel, and preferably of a material that will resist corrosion.

Referring still to FIGS. 2 and 3 there is shown a transition 53, 54 in the internal diameter of male and female housings 20, 40.

In a preferred embodiment the inner electrical contact 50 and outer electrical contact 60 each have four contact plates or rings 51, 61. This number is selected as it corresponds to the number of conductors disposed in the typical coiled tubing 12, 14 in use. A different number of contact rings may be used. Both inner electrical contact 50 and outer electrical contact 60 may contain wiper seals such as seals 52. Wiper seals, formed of an elastomeric insulating material, create ridge-like separations between electrical contacts 51, 61. In a preferred embodiment wiper seals are only present on inner electrical contact 50 and not on outer electrical contact 60.

Also shown on FIGS. 2 and 3 are caps 36, 46 positioned on the male and female housings. These caps are not part of the assembled connector; however, they are attached to each housing during manufacturing to allow for handling and to prevent foreign matter from entering and possibly damaging the housings. In a preferred embodiment, the structure of both the male and the female housings 20, 40 may consist of separate parts that assemble into the final housing.

Figure 4:
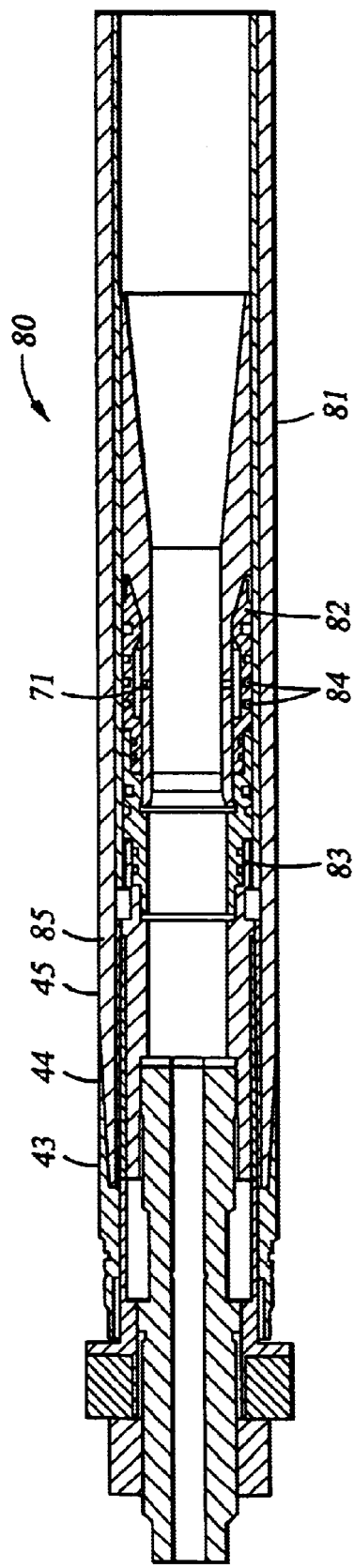
FIG. 4 is a cross-sectional view of the clamping sub-assembly of the connector.

Referring now to FIG. 4, a clamping sub-assembly 80 includes pieces of both the male and female housing and may be converted into either a male housing or a female housing by the assembly of additional parts. A skirt or liner support 81 is shown as a separate piece of the clamping sub-assembly 80. The liner support 81 is joined to the body of the clamping subassembly 80 through a suitable fastener such as a threaded connection or a pressed fitting. Joining the clamping sub-assembly 80 to the liner support 81 are metal and plastic seals 82, 83, which themselves contain o-ring elastomeric seals 84. FIG. 4 also shows a stop clamping ring 85 forming a separate part of the clamping sub-assembly 80. The stop clamping ring 85 forms an underlying structure upon which the outer conical housing 43, inner skirt 44, and split ring 45 are mounted.

Figure 5:
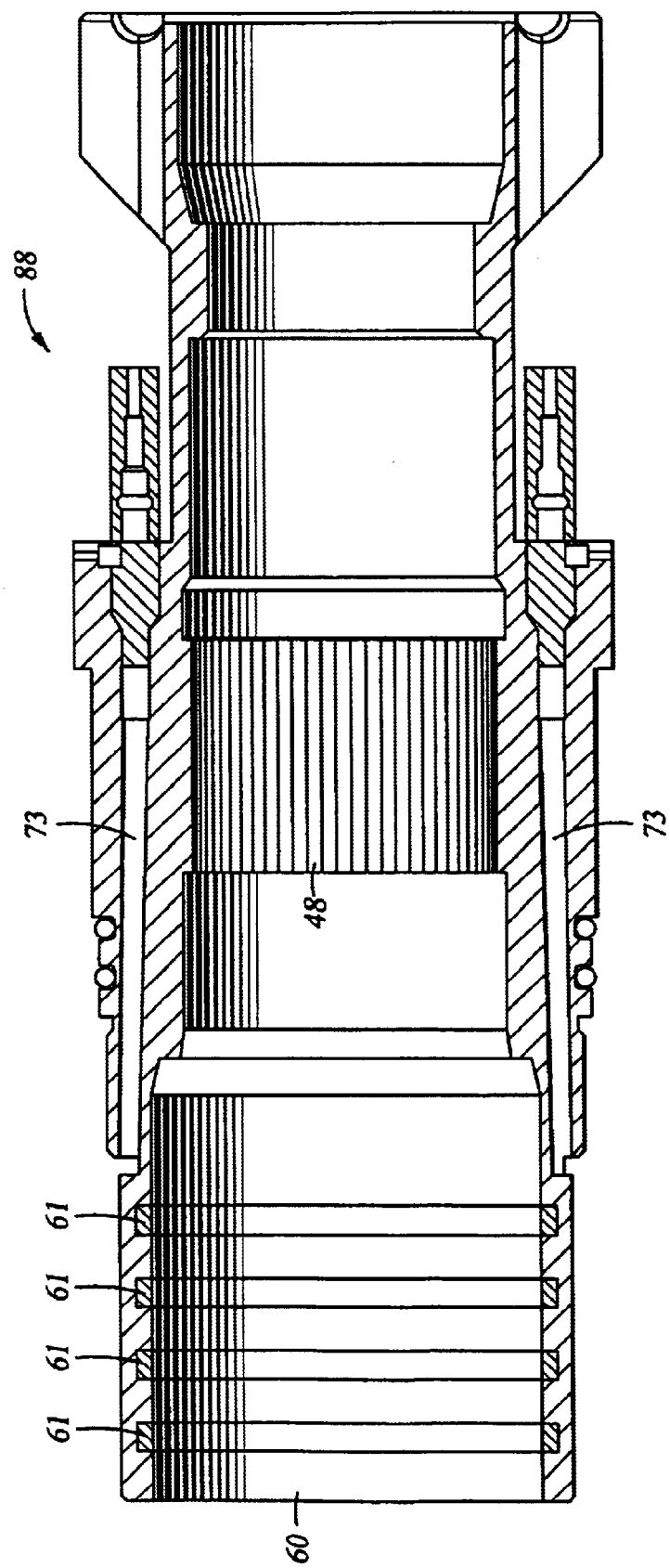
FIG. 5 is a cross-sectional view of the female end piece of the connector.
Figure 6:
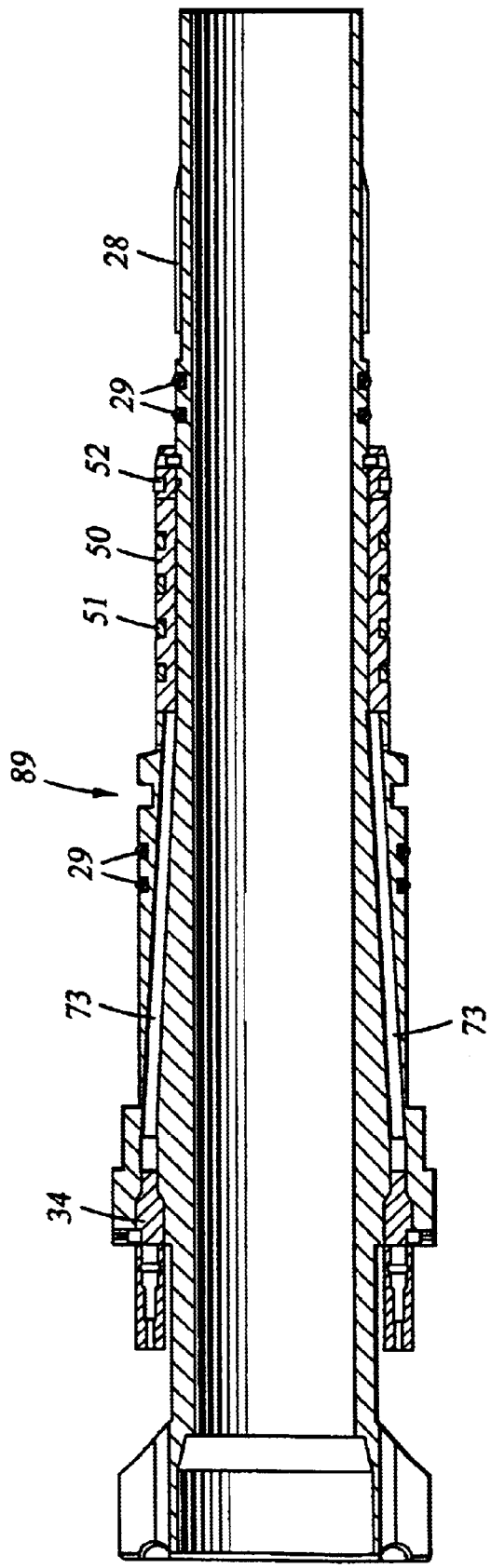
FIG. 6 is a cross-sectional view of the male end piece of the connector.

Referring again to FIG. 3, the clamping sub-assembly 80 further includes a plug 86 and adapter 87. FIG. 3 also shows the clamping sub-assembly 80 further converted to the final female housing 40 through the addition of a female retainer sleeve 88 and female end piece 89. FIGS. 5 and 6 provide a detailed views of female retainer sleeve 88 and female end piece 89. Similarly, FIG. 2 shows the clamping sub-assembly 80 converted into the male housing 20 through the addition of male end-piece 90 and rotating ring 27.

The assembly of male housing 20 and female housing 40 creates the complete connector 10. Assembly of the male and female housings 20, 40 begins by aligning splines 28 located on the male housing 20 with the grooves 48 located on female housing 40. The female housing 40 is constructed with an inner diameter at one end, and the male housing is constructed with a reciprocal outer diameter, so that said male housing 20 may sealingly engage the female housing 40 in assembly.

When male housing 20 is connected to female housing 40, the threads 31 of rotating ring 27 engage the receiving threads 41 of female housing 40. Rotating ring 27 is then rotated so that threads 31 threadingly lock into receiving threads 41. Because rotating ring 27 freely rotates around the barrel 33 of male housing 20, the male housing 20 and female housing 40 do not themselves rotate upon the rotation of rotating ring 27. In this way, the male housing 20 may be firmly connected to the female housing 40 without imparting any twisting or torsional forces on the lengths of composite coiled tubing 12, 14 that are connected to male and female housings 20, 40.

The plurality of apertures 31, 34 and 42 drilled into male housing 20, female housing 40, and rotating ring 27 assist in the connection of male housing 20 to female housing 40. Apertures 32, 34, and 42 in housing 20, ring 27 and housing 40, respectively, include projections from a connection tool (not shown) used to join the lengths 12, 14 of composite coiled tubing at the job site. The engagement allows the connection tool to engage, grasp or manipulate male housing 20, female housing 40, and rotating ring 27. During the assembly step, male housing 20 and female housing 40 are held stationary through use of apertures 32 and 42. At the same time the rotating ring 27 is rotated, through use of apertures 34, so as to join male housing 20 to female housing 40 as described above.

Although apertures 32, 34, 42 have been described for engaging a connection tool, it will be apparent that other methods may be used. For example the apertures 32, 34, 42 may have various shapes. Likewise, instead of apertures, flats may be machined onto these members so as to allow wrenching tools to apply forces at these flats. In addition, chains or frictional tools may be applied to non-machined, smooth surfaces on male housing 20, female housing 40, and rotating ring 27 to apply the necessary gripping forces.

Seals 29 present on male housing 20 and rotating ring 27 are compressed onto corresponding sealing surfaces 49 on female housing 40 when male housing 20 is joined to female housing 40. In this manner the assembled connector 10 provides a fluid-tight seal that isolates fluids in the interior of the coiled tubing 12, 14 from the fluids around the outside of the coiled tubing 12, 14. Seals 29, 37 are placed on male housing 20 and rotating ring 27 for ease of manufacturing and could be equally positioned on female housing 40.

Attachment of the coiled tubing 12, 14 to the connector 10 is similar for both the male and female housings 10, 40. Referring again to FIGS. 2 and 3, there is shown lengths 12, 14 of composite tubing joined to male housing 20 and female housing 40. Male and female housing 20, 40 include an outer conical housing 43 and inner skirt 44. Encircling inner skirt 44 is split ring wedge 45. As can be seen, the end of composite tubing 14 is fitted around split ring wedge 45 and inside the inner radius of outer conical housing 43. As the outer conical housing 43 is drawn against the inner skirt 44, composite tubing 14 is compressively clamped in place against ring wedge 45. Additionally, split ring wedge 45 will be drawn tightly against the composite tubing 14 as the outer conical housing 43 is compressed against inner skirt 44.

In practice it may be advantageous to affix male housing 20 and female housing 40 to the ends of the composite coiled tubing at the factory, job site, or other work site. In that way lengths of coiled tubing that are preassembled with connector ends may then be shipped to the job site. At the job site the male and female portions of the connector may then be joined as needed.

Frictional forces hold the conical housing 43, inner skirt 44, and composite tubing together. In practice clamping forces are achieved such that the strength of the tubing-to-housing bond exceeds the strength of the coiled tubing itself.

When assembling the conical housing 43, inner skirt 44, and split ring wedge 45 to the composite tubing, it is beneficial to cut a taper 56 on the end of the composite tubing 12, 14. The tapers on the conical housing 43, inner skirt 44, split ring wedge 45, and the composite tubing 12, 14 are preferably of approximately the same degree in order to achieve a firm connection. A preferred degree of taper is approximately 1½ degrees.

Figure 7:
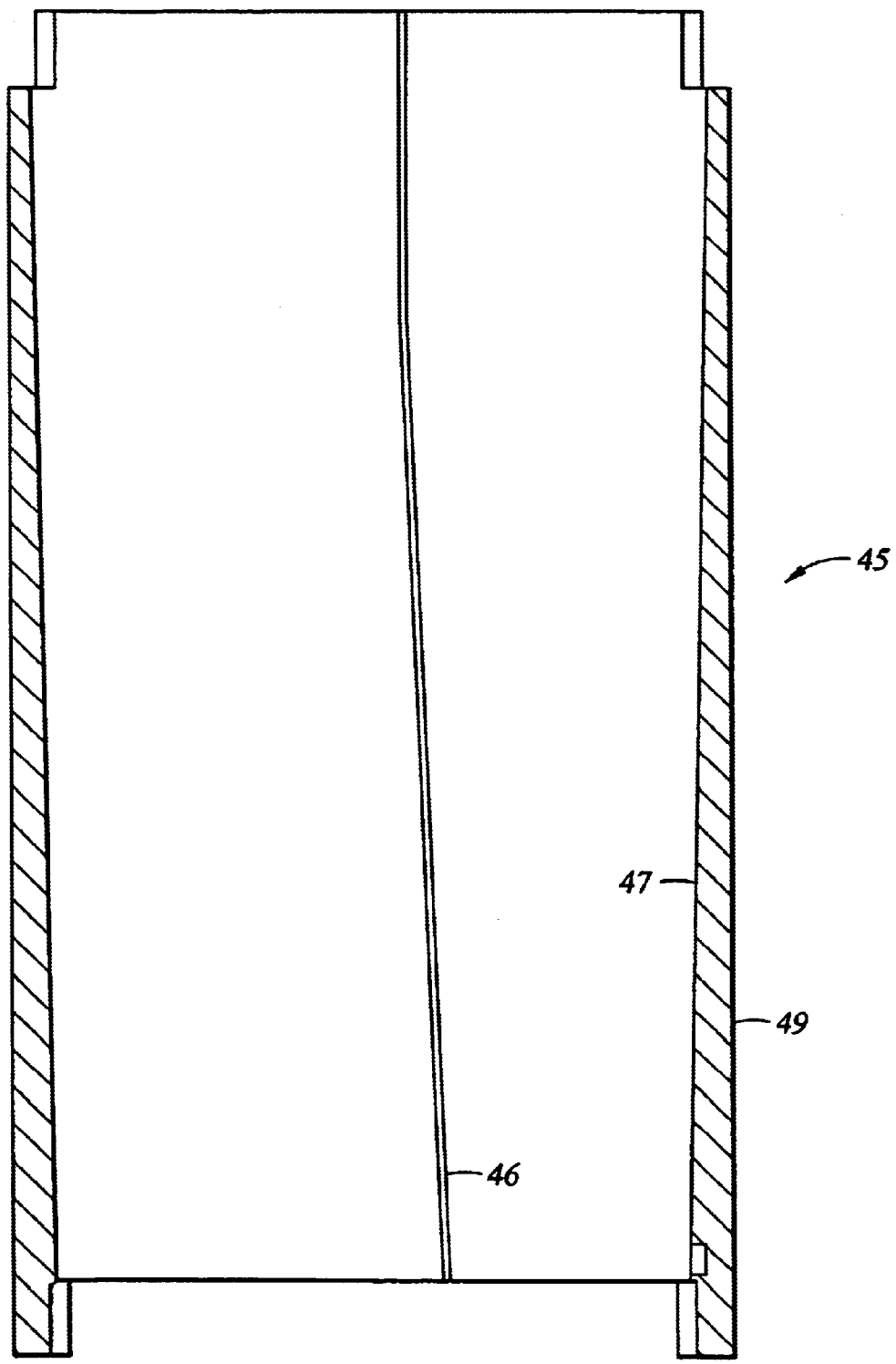
FIG. 7 is a cross-sectional view of a split ring wedge.

Referring now to FIG. 7, there is shown a preferred split ring wedge 45 that is generally cylindrical in shape. The wall thickness of split ring wedge 45 tapers from one end to the other. Further the degree of taper is such that when positioned around inner skirt 44, the inner surface 47 of split ring wedge 45 will bear at all points of surface 47 against inner skirt 44. The outer surface 49 of split ring wedge 45 will also press at all points against composite tubing 14 so as to clamp composite tubing 14 against the inner bearing surface of outer conical housing 43. Split ring wedge 45 does not form a continuous cylinder shape, however. A split 46 runs along the length of split ring wedge 45. The split 46 allows split ring wedge 45 to compress as outer conical housing 43 compresses against inner skirt 44. An identical method is used to join the composite tubing to the male housing 20 as that just described with respect to the joining the composite tubing to the female housing 40. Thus, the composite tubing is likewise joined to the male housing 20 through a friction joint including an outer conical housing 36, an inner skirt 37, and a split ring wedge 38.

As previously stated, when the coiled tubing lengths 12, 14 are connected to female and male housings 40, 20, it is advantageous to taper the end of the coiled tubing that is to be connected. When forming the taper on the end of the coiled tubing, it is also preferred to strip out a working length of the embedded conductors. The conductors are first passed through axial passageways 73, shaped into the female and male housings 40, 20, that allow the conductor to pass from the end of the coiled tubing to the inner electrical contact 50 and outer electrical contact 60.

In a preferred embodiment, the conductors from the composite tubing 12, 14 are not connected directly to the inner electrical contact 50 or the outer electrical contact 60. Rather the contact plates or rings 51, 61 of both the inner electrical contact 50 and outer electrical contact 60 are manufactured with separate conductor leads (not shown). These leads are themselves drawn through passageways 73 in male and female housings 20, 40. During assembly the conductors originating from the coiled tubing are connected or soldered to the lead conductors originating from the contact plates 51, 61. This conductor-to-conductor connection is then covered by a pressure boot (not shown). A pressure boot is essentially an elastomeric seal that keeps out fluids from the conductor-to-conductor contact by pressure means. Pressure boots are known in the industry.

Inner electrical contact 50 and outer electrical contact 60 are positioned on male and female housings 20, 40, respectively, so that when male housing 20 is joined to female housing 40 to form connector 10, the electrical rings 51 of inner electrical contact 50 match up and make electrical contact with outer electrical rings 61 disposed on outer electrical contact 60. Either or both inner electrical contact 50 and outer electrical contact 60 may have a spring back or biasing members that act to hold inner electrical contact 50 and outer electrical contact 60 in firm contact with each other.

Each contact ring 51, 61 is mounted radially and is positioned to mate with a corresponding ring 51, 61. There is an advantage to having the rings 51, 61 mounted in a radial position in that the electrical contact does not then depend on the relative radial positions of male and female housings 20, 40. Rather, it is the relative axial position of both male and female housings 20, 40 that assures the proper alignment and contact between each contact ring 51, 61. Thus, the inner and outer contacts 51, 61 are positioned to align when in the axial position that is achieved when male and female housings 20, 40 are completely connected. There is no need to position the housings 20, 40 in a particular radial position in order to achieve an electrical contact.

The wiper seals 52 found on the inner electrical contact 50 serve a function during assembly. The dimensions of the male and female housing diameters are such that during their assembly into the connector 10, wiper seals 52 are partially compressed. Further, assembly of male and female housings 20, 40 drag the partially compressed wiper seals 52 across the electrical contacts rings 61 of outer electrical contact 60. This dragging action serves to wipe the contact rings 61 clean of any contaminating material, thus assuring a clean mating surface for inner and outer electrical contacts 50, 60.

In operation, once male housing 20 is firmly joined to female housing 40, the assembled connector 10 passes forces of tension and compression up and down the coiled tubing string. In this way successive lengths 12, 14 of coiled tubing may be drawn into the well or extracted from the well. When splines 28 are engaged with grooves 48, torsional forces in one length of tubing are passed to the connected length of another tubing. Additionally, the alignment of splines 28 and grooves 48 allows for a precise rotational alignment of male housing 20 and female housing 40.

The assembled connector 10 also provides a sealed passage for the fluids that are conducted in the coiled tubing. During assembly, seals 29 sealingly engage with receiving surfaces 49. Thus the fluids can pass up and down successive lengths 12, 14 of coiled tubing, through the connector 10, without contacting the materials on the exterior of the coiled tubing.

Referring again to FIG. 1, transitions 53, 54 in the internal diameter of male housing 20 and female housing 40 respectively of the connector 10 direct the fluid as the fluid passes from one length of the coiled tubing and into the connector 10. The fluid encounters a gradual tapered decrease in the internal diameter of the connector 10 as it enters and as the fluid passes out of the connector 10 to another length of the coiled tubing, the internal diameter gradually increases. Thus the taper assists with fluid flow. The gradual taper in the connector 10 reduces turbulence in the flowing fluid. The reduced fluid turbulence serves the added benefit of reducing harm or damage to the interior of the connector 10.

Referring again to FIGS. 2 and 4, liner support 81 extends for some distance along the inner diameter of the coiled tubing. The purpose of the extended length of the inner skirt 81 is to provide a support on which the coiled tubing can rest. The support will prevent the coiled tubing from over flexing and breaking, at the point where the coiled tubing is attached to female housing 40. The length of the inner skirt 44 is preferably from between 1 to 20 times the diameter of the coiled tubing.

Referring again to FIGS. 2, 3, and 4, there is shown a passage 71 and conforming seal 72. Passage 71 allows fluid communication between the interior of composite tubing 12, 14 and conforming seal 72. Conforming seal 72 is made of a deformable material such as rubber or an elastomer. Thus, when fluid in the interior of the coiled tubing flows into passage 71, pressure in the fluid is applied to conforming seal 72. In this manner conforming seal 72 acts to seal coiled tubing against the male and female housings 20, 40.

Electrical signals are transmitted through the conductors embedded in coiled tubing 12, 14. These conductors pass through passageways 73 in male housing 20 until they make electrical contact with electrical contact rings 51 of inner electrical contact 50. At this point, the electrical signals, or electrical energy if the cables are energy-carrying conductors, pass from inner electrical contact 50 to outer electrical contact 60. The signals are further transmitted through the female housing 40 through the passageways 73 in the female housing 40 and on into the cables of the coiled tubing 14 that is attached to the female housing 40.

Wiper seals 52 also serve to isolate and insulate the contact rings 61 from the fluids and other materials that are either outside the composite tubing 12, 14, or being conducted inside the composite tubing 12, 14. Thus wiper seals 52 protect the contact rings 51, 61 from chemical corrosion and physical decay. By insulating the metal plates or rings 51, 61, wiper seals 52 also assure that an uninterrupted contact is maintained between the conducting conductors of the upper and lower lengths 12, 14 of the coiled tubing. Finally wiper seals 52 also act to insulate individual electrical rings 51, 61 from each other. Thus no signal interference or power loss occurs as a result of crossed or fouled connections among the electrical plates.

Figure 8:
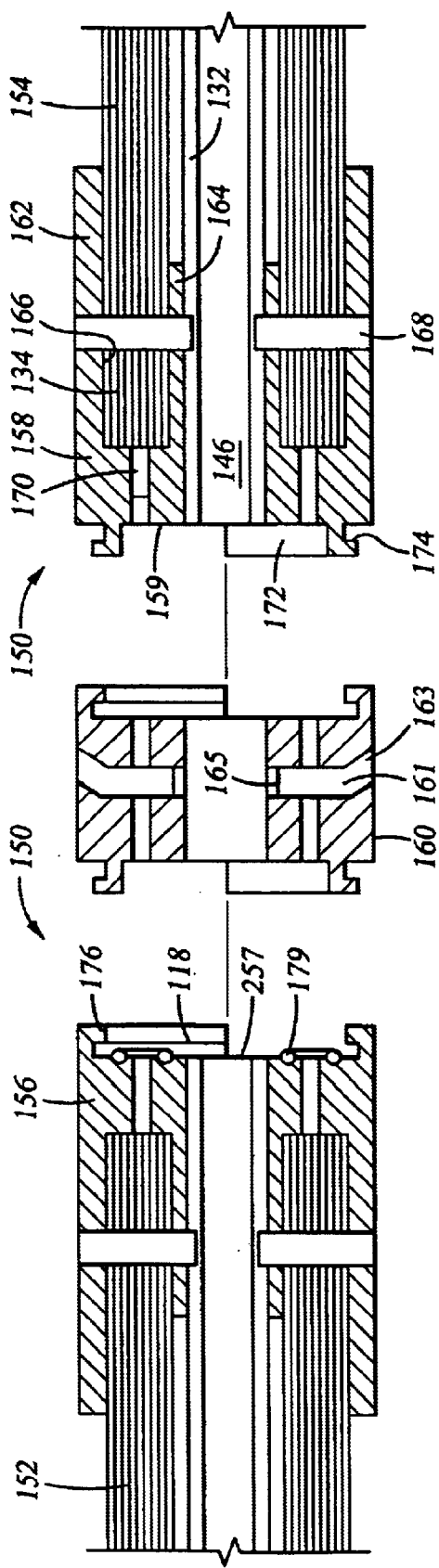
FIG. 8 is a cross-section view of an alternative embodiment of the connector.
Figure 9:
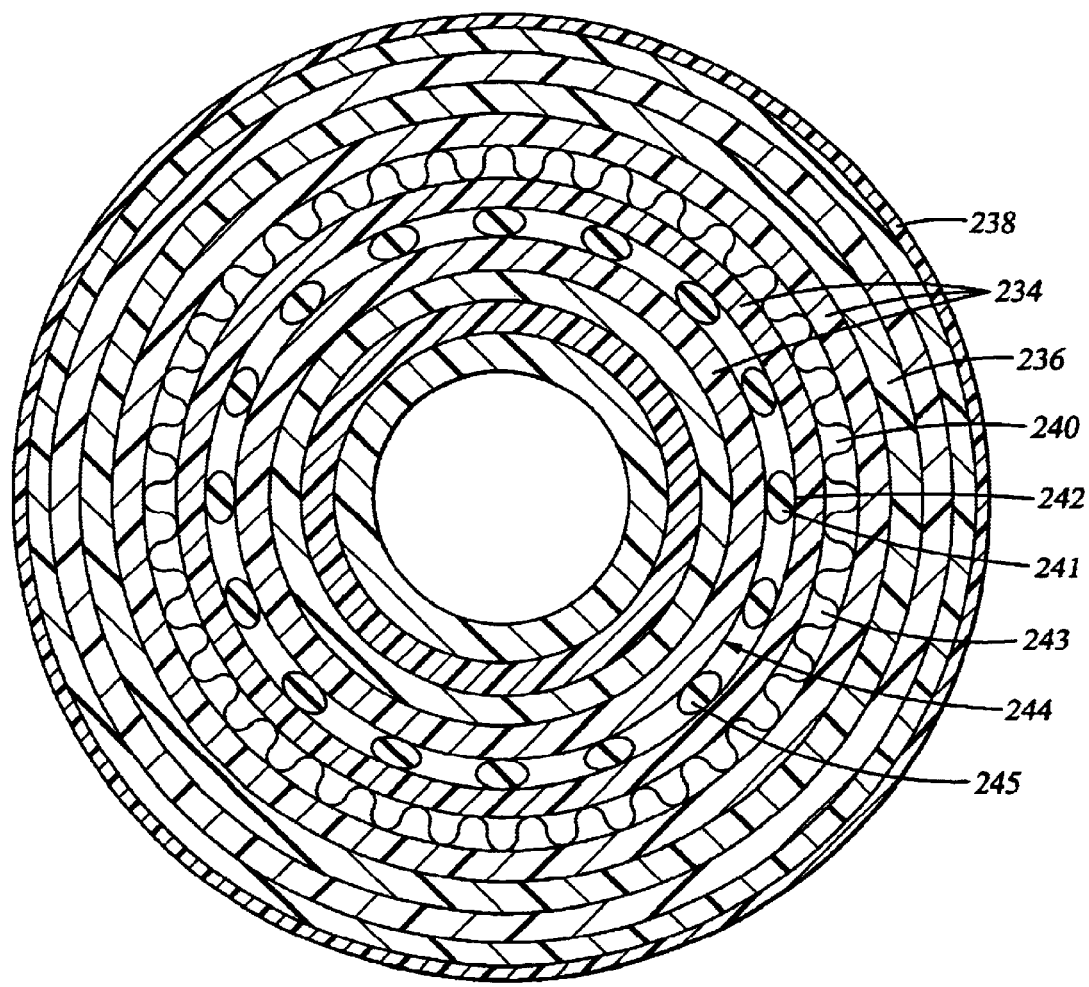
FIG. 9 is a cross-section view of a coiled tubing.

Referring now to FIG. 8, there is shown an alternative connector 150 for connecting adjacent lengths 152, 154 of composite umbilical. A jet sub 160 may be disposed in connector 150 as hereinafter described. Connector 150 includes a female end connector 156 mounted on composite umbilical length 152 and a male end connector 158 mounted on composite umbilical length 154. Describing end connector 158 in detail, end connector 158 includes an end face 159, an outside tubular housing 162 and an inner tubular skirt 164 forming an annular area 166 for receiving a plurality of load carrying layers 134. As can be seen, inner liner 132 extends through inner tubular skirt 164. One or more pins 168 extend through housing 162, load carrying layers 134, and inner skirt 164 for connecting end connector 158 to the terminal end of composite umbilical length 154. Other types of connectors are shown in U.S. Pat. Nos. 4,844,516 and 5,332,049, both incorporated herein by reference.

A plurality of connectors 170 are provided in the end face 159 of end connector 158 for connection to electrical conductors and data transmission conductors housed between load carrying layers 134. Connectors for fiber optic cables are described in U.S. Pat. Nos. 4,568,145; 4,699,454; and 5,064,268, all incorporated herein by reference. A connector for coaxial cable is shown in U.S. Pat. No. 4,698,028, incorporated herein by reference. For electrical conductors in tubing, see U.S. Pat. No. 5,146,982, incorporated herein by reference. Another type of fiber optic connector is manufactured by Dean G. O'Brien of California.

Connector 150 is a quick connect connector. One type of quick connection is the bayonet type connection shown in FIG. 8. The male end connector 158 includes a plurality of arcuate segments 172 having a outwardly projecting tapered surface 174 adapted for mating with female connector 156 having a plurality of arcuate segments 176 with an inwardly directed and tapered flange 178. In operation, the segments on male end connector 158 are inserted between the segments 176 on end connector 156 and then end connector 158 is rotated with tapered surfaces 174, 178 drawing the two end faces 157, 159 of end connectors 156, 158 together. The end face of female end connector 156 includes a plurality of high pressure sealing members 179 which sealingly engage the end face 159 of male end connector 158. Upon full engagement of end connectors 156, 158 to form connector 150, the connectors 170 for electrical conductors and data transmission conductors are in alignment and are connected for transmission of electrical current or data.

It should be appreciated that end connectors 156, 158 are preferably mounted on the ends of a composite umbilical during the manufacturing process and therefore are already mounted on the ends of the umbilical upon transport to the drilling site. It should also be appreciated that the end connectors 156, 158 need not be made of metal but may be made of a composite. A composite end connector could be heat bonded to the end of the composite umbilical. Also, it should be appreciated that other types of quick connections could be used such as the type of quick connection used for high pressure hose connections.

One alternative to the individual connectors 164, 166 for conductors are communication links which electromagnetically transmit signals around the connections rather than go through connector 150. See U.S. Pat. No. 5,160,925, incorporated herein by reference. It is preferred, however, for the conductors to be directly connected together at connection 150.

Referring again to FIG. 8, a reverse jet sub 160 may be disposed between the end connectors 156, 158 of connector 150. Jet sub 160 includes a plurality of ports 161 communicating with the flowbore and a nozzle 163 in each port 161 extending to exterior of jet sub 160 at an upstream angle. A valve 165 is also disposed in each port 161 for controlling the passage of fluid through ports 161. Valves 165 may be controlled from the surface. As the cuttings from a bit travel up the annulus, they may tend to concentrate in the annulus and fail to flow to the surface. Reverse jet sub 160 allows hydraulic fluid to pass through nozzle 163 to form fluid jets to force the cuttings up past the shoe of the cased borehole where friction is reduced and the cuttings are allowed to flow to the surface. Reverse jet subs 160 may be disposed at each connection 150 to sweep the cuttings up the annulus so that they can be flowed to the surface.

The composite umbilical is not required to withstand a great amount of tension or compression. As the drilling fluids pass down the flowbore 146 and up the annulus, the drilling fluids provide a buoyancy to the composite umbilical thereby reducing the tension and compression placed on the composite umbilical. Further, since composite umbilical does not rotate within the borehole, the composite umbilical is isolated from any reactive torque from bottom hole assembly.

The composite umbilical also has sufficient tensile and compression strength to withstand most extraordinary conditions during drilling. For example, if the bottom hole assembly becomes stuck in the well, the composite umbilical has sufficient tensile strength to withdraw the stuck bottom hole assembly in most situations. Further, if the bottom hole assembly is run into a producing well, the composite umbilical may be run in against the pressure of the producing well which applies compressive loads as the result of hydrostatic or formation pressures. This sometimes occurs in a workover well to be restimulated to enhance production. The composite umbilical will have internal pressure from the drilling fluids so as to balance the external well pressure as well as adequate collapse strength.

Various types of data may be transmitted to the surface utilizing the data transmission conduits in the composite umbilical. Some of the types of data which may be transmitted to the surface include inclination, azimuth, gyroscopic survey data, resistivity measurements, downhole temperatures, downhole pressures, flow rates, rpms of the power section, gamma ray measurements, fluid identification, formation samples, and pressure, shock, vibration, weight on bit, torque at bit, and other sensor data. The bottom hole assembly, for example, may include a pressure sub for sensing the pressure in the annulus of the borehole.

The data transmission conduit is preferably fiber optic cable. Fiber optic cable has a very large band width allowing the transmission of large amounts of data which then can be processed by powerful computers at the surface. Using fiber optic cable, the data transmission rates are fast and a greater amount of data can be transmitted. By processing the data at the surface, the bottom hole assembly is much less expensive and is much more efficient. The ability to have a high data transmission rate to the surface allows the elimination of most of the electronics of prior art bottom hole assemblies. It also enhances the reliability of transmission of the data to the surface since pulsing the data through the mud column is eliminated.

While a preferred embodiment of the invention has been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

We claim:

1. A connector for establishing an electrical connection between sections of composite coiled tubing comprising:
   a first section of composite coiled tubing having a wall comprising a liner and a plurality of load carrying layers, wherein a plurality of conducting wires are embedded between the load carrying layers;
   a second section of composite coiled tubing having a wall comprising a liner and a plurality of load carrying layers, wherein a plurality of conducting wires are embedded between the load carrying layers;
   wherein the load carrying layers are arranged to provide the coiled tubing with tensile and compressive strength;
   a male housing affixed to the first section of composite coiled tubing and having passageways formed to allow the wires embedded in the composite coiled tubing to pass through said passageways;
   a female housing affixed to the second section of composite coiled tubing and having passageways formed to allow the wires of the composite coiled tubing to pass through said passageways;
   said male and female housings including mechanical connectors connecting the first and second sections of composite coiled tubing;
   said male housing including a first electrical contact comprising at least one embedded contact plate; a plurality of wiper seals, and a passageway to allow wire from the first composite coiled tubing to connect to said contact plate; and
   said female housing including a second electrical contact comprising at least one embedded matching plate and a passageway to allow wire from the second composite coiled tubing to connect to said matching plate, and said second electrical contact positioned so that said contact plate of said first electrical contact ring firmly engages said matching plate of said second electrical contact ring when said male housing is joined to said female housing.

2. A connector for establishing an electrical connection between a first and second section of composite coiled tubing having wiring embedded between a plurality of load carrying layers, the connector and sections of composite coiled tubing supporting a well apparatus in a well, comprising:
   a male housing affixed to the first section of composite coiled tubing, said male housing having passageways formed to allow the wires embedded in the composite coiled tubing to pass through said passageways;
   a female housing affixed to the second section of composite coiled tubing, said female housing having passageways formed to allow the wires embedded in the composite coiled tubing to pass through said passageways;
   said male and female housings including mechanical connectors connecting the first and second sections of composite coiled tubing;
   said male housing including a first electrical contact comprising at least one embedded contact plate; a plurality of wiper seals, and a passageway to allow wire from the first composite coiled tubing to connect to said contact plate;
   said female housing including a second electrical contact comprising at least one embedded matching plate and a passageway to allow wire from the second composite coiled tubing to connect to said matching plate, and said second electrical contact positioned so that said contact plate of said first electrical contact ring firmly engages said matching plate of said second electrical contact ring when said male housing is joined to said female housing; wherein said first electrical contact mounted on said male housing comprises a plurality of contact plates and wherein said second electrical contact mounted on said female housing comprises an equal number of matching plates; and
   said male and female housings and the load carrying layers being arranged to allow said connected sections of composite coiled tubing to support burst and collapse pressures, pull and compression loads, and high strains imposed by bending that may be placed on the sections of composite coiled tubing by the well apparatus.

3. A connector according to claim 1, further comprising biasing means to bias said contact plates against said matching plates when said male housing is joined to said female housing.

4. A connector for establishing an electrical connection between a first and second section of composite coiled tubing having electrical wiring embedded in a wall of the composite coiled tubing for extending into a well, comprising:
   a male housing affixed to the first section of composite coiled tubing;
   a male electrical ring disposed on said male housing and having a conductor connected to the embedded wire from the first section of composite coiled tubing;
   a female housing affixed to the second section of composite coiled tubing and having an aperture adapted to receive said male electrical ring;
   a female electrical ring disposed in the aperture in said female housing and having a conductor connected to the embedded wire from the second section of composite coiled tubing, said male electrical ring adapted to electrically engage the female electrical ring upon said male electrical ring being received by the aperture, wherein said male electrical ring and said female electrical ring are adapted to electrically engage when one ring is positioned inside the other;

a mechanical connector having at least a portion thereof received by said aperture and movably disposed on said male housing to connectably engage said female housing while said male and female housings are stationary.

5. A connector for joining lengths of composite coiled tubing comprising:

a male housing that may be affixed to one end of a first length of composite coiled tubing; said mail housing having a hollow shape so as to permit fluids in the composite coiled tubing to pass through said male housing;

a female housing that may be affixed to one end of a second length of composite coiled tubing; said female housing having a hollow shape so as to permit fluids in the composite coiled tubing to pass through said female housing; said female housing also formed to sealingly engage said male housing and having receiving threads located on an inner circumference of said female housing;

a rotating ring, rotatably mounted on said male housing, having engaging threads located on said rotating ring; said engaging threads placed so as to engage said receiving threads on said female housing, whereby rotating said rotating ring sealingly engages said male housing to said female housing;

first electrical contact disposed on said male housing comprising a plurality of contact rings and wiper seals, said contact rings having wire leads that may be joined to wires embedded in a length of composite coiled tubing that may be affixed to said male housing;

a second electrical contact disposed on the inner circumference of said female housing comprising a plurality of contact rings, said contact rings having wire leads that may be joined to wires embedded in a length of composite coiled tubing that may be affixed to said female housing; and biasing means located under said contact rings located on said male housing, said biasing means acting to firmly engage said contact rings of said first electrical contact against said contact rings of said second electrical contact when said male housing is joined to said female housing.

6. A connector for joining lengths of composite coiled tubing for extending into a well and supplying pressurized fluids downhole to perform a downhole operation, the connector comprising:

a first length of composite coiled tubing comprising a wall formed from a liner and a plurality of load carrying layers, said tubing having at least one electrical conductor embedded within the wall;

a second length of composite coiled tubing comprising a wall formed from a liner and a plurality of load carrying layers, said tubing having at least one electrical conductor embedded within the wall;

wherein the load carrying layers are arranged to provide the tubing with tensile and compressive strength;

a first mechanical connector affixed to said first length of composite coiled tubing, and including a first electrical connector; and a second mechanical connector affixed to said second length of composite coiled tubing and including a second electrical connector, a connecting member rotatably disposed on one of said first and second mechanical connectors and being received in the other one of said first and second mechanical connectors, said connecting member threadingly engaging the other one of said first and second mechanical connectors and connecting the first and second lengths of composite coiled tubing without rotating said mechanical connectors affixed to the sections of composite coiled tubing;

said first and second mechanical connectors being configured such that when said first mechanical connector engages said second mechanical connector the first and second length of tubing are mechanically connected and a conducting link is formed by said first and second electrical connectors between the embedded electrical conductors.

7. A connector for joining lengths of composite coiled tubing for extending into a well and supplying pressurized fluids downhole to perform a downhole operation, the connector comprising:

a first length of composite coiled tubing having at least one electrical conductor embedded within a wall of said first length of composite coiled tubing;

a second length of composite coiled tubing having at least one electrical conductor embedded within a wall of said second length of composite coiled tubing;

a first mechanical connector affixed to said first length of composite coiled tubing, and including a first electrical connector; and a second mechanical connector affixed to said second length of composite coiled tubing and including a second electrical connector, a connecting member rotatably disposed on one of said first and second mechanical connectors and being received in the other one of said first and second mechanical connectors, said connecting member threadingly engaging the other one of said first and second mechanical connectors and connecting the first and second lengths of composite coiled tubing without rotating said mechanical connectors affixed to the sections of composite coiled tubing;

said first and second mechanical connectors being configured such that when said first mechanical connector engages said second mechanical connector the first and second length of tubing are mechanically connected and a conducting link is formed by said first and second electrical connectors between the embedded electrical conductors, wherein engagement of said first mechanical connector with said second mechanical connector includes a splined connection and further produces a seal that isolates fluids in the interior of the coiled tubing from the fluids around the outside of the coiled tubing.

8. A connector for joining a first length of composite coiled tubing having a first electrical conductor embedded in a wall thereof and a second length of composite coiled tubing having a second electrical conductor embedded in a wall thereof, the lengths of composite coiled tubing extending into a well for supplying pressurized fluids downhole, the connector comprising:

first and second mechanical members;

means for mechanically coupling the first and second lengths of composite coiled tubing to said first and second mechanical members, respectively;

means for mechanically coupling said first mechanical member to said second mechanical member without rotating said first or second mechanical members, wherein said means for mechanically coupling includes means for drawing the mechanical members together to prevent separation under tensile loads;

means for electrically connecting the conductors embedded in the first and second composite coiled tubing lengths to said first and second mechanical members, respectively; and means for electrically connecting the first and second electrical conductors when said first and second mechanical members are mechanically coupled.

9. A connector for joining lengths of composite coiled tubing extending into a well for supplying pressurized fluids downhole and having electrical wiring embedded therein, comprising:

a first length of composite coiled tubing having a wall comprising a liner and a plurality of load carrying layers wrapped around the liner, wherein a plurality of conducting wires are embedded between the load carrying layers and the load carrying layers are arranged to provide the tubing with tensile and compressive strength;

a second length of composite coiled tubing having a comprising a liner and a plurality of load carrying layers wrapped around the liner, wherein a plurality of conducting wires are embedded between the load carrying layers and the load carrying layers are arranged to provide the tubing with tensile and compressive strength;

first mechanical coupling means for attaching first and second end connectors to separate lengths of composite coiled tubing;

second mechanical coupling means for mechanically coupling said first and second end connectors wherein said coupling achieves a hydraulic seal adapted to withstand the pressurized fluids;

first electrical coupling means for electrically coupling said wiring embedded in said composite coiled tubing to said first and second end connectors;

second electrical coupling means for electrically coupling said first and second end connectors when said end connectors are mechanically coupled; and said first and second lengths of composite coiled tubing being coilable.

10. The connector according to claim 9 where said first and second end connectors are disposed on the exterior of said mechanically coupling means and further include cooperating mating surfaces that are coupled to said conducting wires and provide signal communication between said conducting wires when said first and second end connectors are joined.

11. The connector according to claim 10 wherein said embedded conducting wires comprise electrical wires and the mating surfaces mate through axial movement and not rotational movement.

12. A connector for providing a simultaneous mechanical, electrical, and hydraulic connection between first and second lengths of composite coiled tubing comprising:

a male housing having a bore therethrough so as to permit fluids in the composite coiled tubing to pass through said male housing and wherein said male housing is adapted to be affixed and sealed to one end of the first length of composite coiled tubing thereby providing a hydraulic seal;

a female housing having a bore therethrough so as to permit fluids in the composite coiled tubing to pass through said female housing and wherein said female housing is adapted to be affixed and sealed to one end of the second length of composite coiled tubing thereby providing a hydraulic seal;

said female and male housings having cooperating mating threaded members that mechanically couple said male housing to said female housing, wherein said cooperating mating threaded members are engaged and disengaged without relative rotation between said female and male housings when affixed to the first and second lengths of composite coiled tubing;

sealing means disposed on said male and female housings such that mechanically coupling said male and female housings provides a hydraulically sealed passage for fluids to pass through the first length of coiled tubing, said male and female housings, and the second length of composite coiled tubing;

a first electrical contact disposed on said male housing and electrically linked to electrical wiring embedded in the first length of composite coiled tubing;

a second electrical contact disposed on said female housing and electrically linked to electrical wiring embedded in the second length of composite coiled tubing, said first and second electrical contacts disposed such that mechanically engaging said male and female housings electrically couples said first electrical contact and said second electrical contact.

13. The connector according to claim 12 further comprising:

a rotating ring mounted on said male housing;

a first thread means disposed on said rotating ring:

a second thread means disposed on said female housing such that rotating said rotating ring engages said first thread means with said second thread means, thereby mechanically engaging said male housing to said female housing.

14. The connector according to claim 13 wherein said first electrical contact is disposed on said male housing adjacent said rotating ring.

15. The connector according to claim 12 wherein said housings are made of metal and said first electrical contact and said second electrical contact are mounted on said metal housings and are cooperating ring contacts.

16. The connector according to claim 15 for composite coiled tubing having four embedded electrical wires, wherein said cooperating ring contacts comprise four circumferentially mounted electrical contacts electrically connected to the four embedded wires.

17. The connector according to claim 12 wherein said sealing means comprise at least one ring seal sealingly engaging a cooperating seal surface.

18. The connector according to claim 12, further comprising at least one spline and groove that cooperatingly engage when said male and female housings are mechanically engaged.

19. The connector according to claim 12 wherein said male and female housings further comprise a pressure connecting means whereby said male and female housings are affixed to an end of composite coiled tubing thereby providing a hydraulic seal between said male housing and female housing and said tubing.

20. A connector for establishing an electrical connection between sections of composite coiled tubing extending into a well for supplying pressurized fluids downhole, comprising:

a first section of composite coiled tubing having wiring embedded in a wall thereof;

a second section of composite coiled tubing having wiring embedded in a wall thereof;

a male housing affixed to said first section of composite coiled tubing and having a first passageway therethrough to allow an electrical conductor to pass through said male housing;

a female housing having an aperture therethrough affixed to said second section of composite coiled tubing and having a second passageway formed therethrough to allow an electrical conductor to pass through said female housing;

said male housing being received by said aperture in said female housing and connecting the first and second sections of composite coiled tubing;

a first electrical contact ring disposed exteriorly of said male housing, said first electrical contact ring comprising at least one circumferential contact plate, said first electrical contact ring including a third passageway therethrough; and a second electrical contact ring disposed interiorly of said female housing, said second electrical contact ring comprising at least one circumferential matching plate, and said second electrical contact ring including a fourth passageway therethrough;

said contact plate and said matching plate being positioned such that said contact plate firmly engages said matching plate when said male housing is received by said female housing; and said first and third passageways communicating such that an electrical conductor can extend therethrough from said first section of composite coiled tubing to said contact plate and said second and fourth passageways communicating such that an electrical conductor can extend therethrough from said second section of composite coiled tubing to said matching plate.

21. A connector according to claim 20 wherein said first electrical contact ring disposed on said male housing comprises four contact plates and wherein said second electrical contact ring disposed on said female housing comprises four matching plates.

22. A connector according to claim 20, further comprising biasing means to bias said contact plates against said matching plates when said male housing is joined to said female housing.

23. A connector for joining first and second lengths of composite coiled tubing, each length of composite coiled tubing including an embedded electrical conductor, comprising:

a male housing that may be affixed to one end of said first length of composite coiled tubing; said male housing having bore therethrough so as to permit fluids in the composite coiled tubing to pass through said male housing;

a female housing that may be affixed to one end of a second length of composite coiled tubing; said female housing having a bore therethrough so as to permit fluids in the composite coiled tubing to pass through said female housing; said female housing having female threads;

a rotating ring rotatably mounted on said male housing, said rotating ring including male threads; said male threads positioned so as to engage said female threads;

at least one seal disposed between said male and female housings such that rotation of said rotating ring sealingly and mechanically connects said male housing to said female housing;

a first electrical contact disposed on said male housing, said first electrical contact comprising at least one contact ring having a wire lead that can be joined to an electrical conductor embedded in said first length of composite coiled tubing;

a second electrical contact disposed on the inner circumference of said female housing, said second electrical contact comprising at least one contact ring having a wire lead that can be joined to an electrical conductor embedded in said second length of composite coiled tubing; and at least one biasing means acting to firmly engage said contact rings of said first electrical contact against said contact rings of said second electrical contact when said male housing is joined to said female housing.

24. A connector for joining lengths of composite coiled tubing for extending into a well and supplying pressurized fluids downhole, the connector comprising:

a first length of composite coiled tubing having a plurality of electrical conductors embedded within a wall of said first length of composite coiled tubing;

a second length of composite coiled tubing having a plurality of electrical conductors embedded within a wall of said second length of composite coiled tubing;

a first mechanical connector affixed to said first length of composite coiled tubing, and including a first electrical connector comprising a plurality of contact regions, wherein each contact region is in communication with a corresponding one of said plurality of electrical conductors; and a second mechanical connector affixed to said second length of composite coiled tubing and including a second electrical connector comprising a plurality of contact regions, wherein each contact region is in communication with a corresponding one of said plurality of electrical conductors;

a connecting member rotatably disposed on one of said first or second mechanical connectors and being received in the other one of said first or second mechanical connectors, said connecting member threadingly engaging the other one of said first and second mechanical connectors and connecting the first and second lengths of composite coiled tubing without rotating said mechanical connectors affixed to the sections of composite coiled tubing;

said first and second mechanical connectors being configured such that when said first mechanical connector engages said second mechanical connector the first and second length of tubing are mechanically connected and such that the contact regions of said first electrical conductor align with the corresponding contact regions of said second electrical conductor thus forming a plurality of conducting links between the embedded electrical conductors.

25. A connector for joining lengths of composite coiled tubing for extending into a well to support a well apparatus, the connector comprising:

a first section of composite coiled tubing having a wall comprising a liner and a plurality of load carrying layers, wherein a plurality of electrical conductors are embedded between the load carrying layers;

a second section of composite coiled tubing having a wall comprising a liner and a plurality of load carrying layers, wherein a plurality of electrical conductors are embedded between the load carrying layers; first and second mechanical members having an outside diameter substantially the same as the outside diameter of the composite coiled tubing;

first means for mechanically coupling the first and second lengths of composite coiled tubing to said first and second mechanical members, respectively;

second means for mechanically coupling said first mechanical member to said second mechanical member without rotating said first or second mechanical members; and said first and second means and said load carrying layers of said first and second sections of composite coiled tubing being arranged to allow said connected sections of composite coiled tubing to support burst and collapse pressures, pull and compression loads, and high strains imposed by bending that may be placed on the sections of composite coiled tubing by the well apparatus.

26. The connector of claim 25 further comprising means for electrically connecting the conductors embedded in the first and second composite coiled tubing lengths to said first and second mechanical members, respectively;

means for electrically connecting the first and second electrical conductors when said first and second mechanical members are mechanically coupled; and said first and second sections of composite coiled tubing being coilable.

* * * * *